United States Patent [19]
Gongwer et al.

[11] Patent Number: 5,816,137
[45] Date of Patent: Oct. 6, 1998

[54] COOKING MACHINE WITH DOOR LATCH

[75] Inventors: Todd Gongwer; David Sheets, both of Wakarusa, Ind.

[73] Assignee: Nelgo Mfg. Corporation, Wakarusa, Ind.

[21] Appl. No.: 955,730

[22] Filed: Oct. 22, 1997

[51] Int. Cl.⁶ ............................... A47J 37/00; A47J 37/04
[52] U.S. Cl. ............................... 99/345; 99/400; 99/401; 99/443 C; 99/446
[58] Field of Search ............................... 99/345–347, 386, 99/389, 391, 400, 401, 402, 427, 443 R, 443 C, 444–446, 447, 448, 450, 477–479; 16/82, 85; 49/100, 280, 462; 52/64, 71; 126/197, 192; 219/394, 393, 396, 413; 292/254, 336.3, 67, 82, 205, 238, 207, 290, 297, 298, DIG. 68, DIG. 69

[56] References Cited

U.S. PATENT DOCUMENTS

| | | | |
|---|---|---|---|
| 3,499,380 | 3/1970 | Gongwer | 99/345 |
| 3,704,548 | 12/1972 | Wiegleb | 49/199 |
| 3,815,943 | 6/1974 | Hass | 292/254 |
| 3,838,877 | 10/1974 | Hanson | 292/254 X |
| 4,103,606 | 8/1978 | Gitcho | 99/443 C |
| 4,453,457 | 6/1984 | Gongwer et al. | 99/345 |
| 4,599,938 | 7/1986 | Gongwer | 99/446 |
| 4,600,596 | 7/1986 | Gongwer et al. | 99/443 C |
| 4,947,741 | 8/1990 | Gongwer | 99/345 |
| 4,986,174 | 1/1991 | Gongwer | 99/345 |
| 5,205,208 | 4/1993 | Gongwer | 99/386 X |
| 5,539,954 | 7/1996 | Ambar | 16/85 |
| 5,542,345 | 8/1996 | Gongwer | 99/345 |

*Primary Examiner*—Timothy F. Simone
*Attorney, Agent, or Firm*—Baker & Daniels

[57] ABSTRACT

A cooking machine includes a housing having side walls with doors that can be raised and lowered to vent the cooking chamber defined within the housing. A latching member is pivotally mounted on a channel member guiding the doors, and can be pivoted manually into a position in which it engages the bottom surface of the door thereby retaining the door in the upward most position. When the door is to be lowered, the latching member is pivoted to a position by gravity which pivots the latching member out of the line of travel of the door. The door can then be lowered to the lowered position.

9 Claims, 5 Drawing Sheets

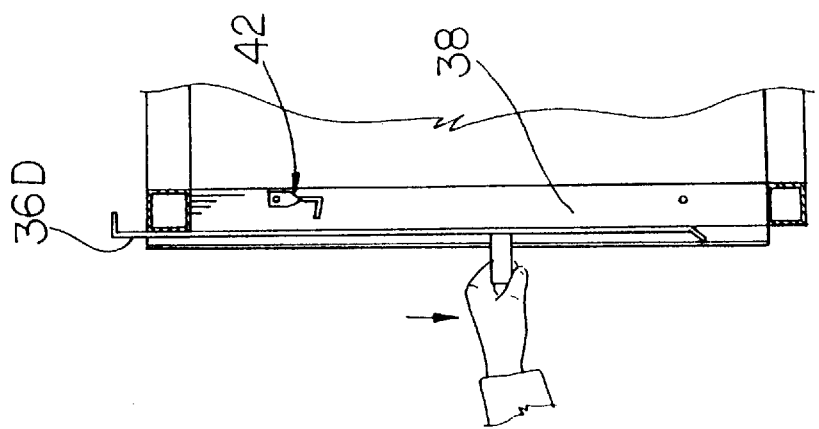
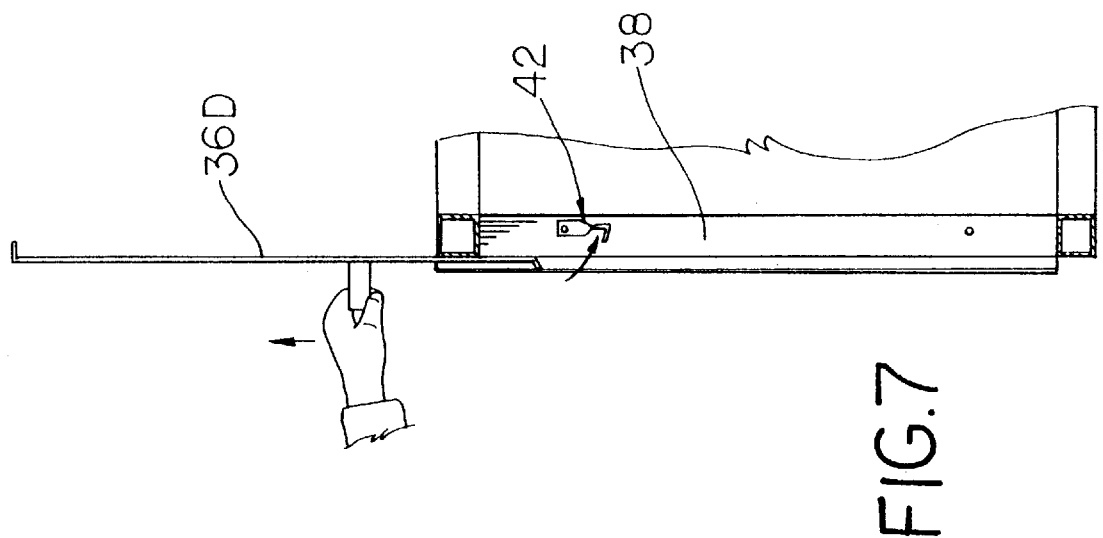

COOKING MACHINE WITH DOOR LATCH

This invention relates to a machine for cooking food products.

Automatic food cooking machines which are used in the quantity preparation of food products are disclosed in U.S. Pat. No. 3,499,380; 4,103,606; 4,947,741; and 5,542,345. These machines include a conveyor upon which food products are placed to be cooked, an area beneath the conveyor in which a heat source (either charcoal or gas burners) are provided for generating cooking heat, doors at the front and back of the unit through which food product is loaded onto the conveying mechanism and removed from the conveying mechanism when done, and doors along the side thereof which may be raised and lowered for periodically venting the cooking chamber within the machine, to assure proper combustion and/or to vent smoke and moisture from the cooking chamber or to reduce the temperature therein if overheated. The temperature within the unit may reach 500° F. or higher, and it is necessary to quickly be able to raise and lower the doors along the sides thereof and to retain the latter in their raised position during venting.

According to the present invention, a latching member is pivotally connected to one of the channel members which serve as door guides on the sides of the cooking machine. The latching members are engagable with the bottom of the door to hold the door in the raised or venting position, but pivot out of the way and are biased by gravity away from the door to permit the latter to be lowered unimpeded. Accordingly, the door may be latched in the open position by the use of the latching member but can be lowered by raising the door out of engagement with the latching member and then lowering the door.

These an other advantages of the present invention will become apparent from the following description, with reference to the accompanying drawings, in which:

FIGS. 5–8 show the manner in which the latching member is used to retain the door in the open position and the manner in which the latching member is released from the door to permit the door be lowered.

Figure 1:
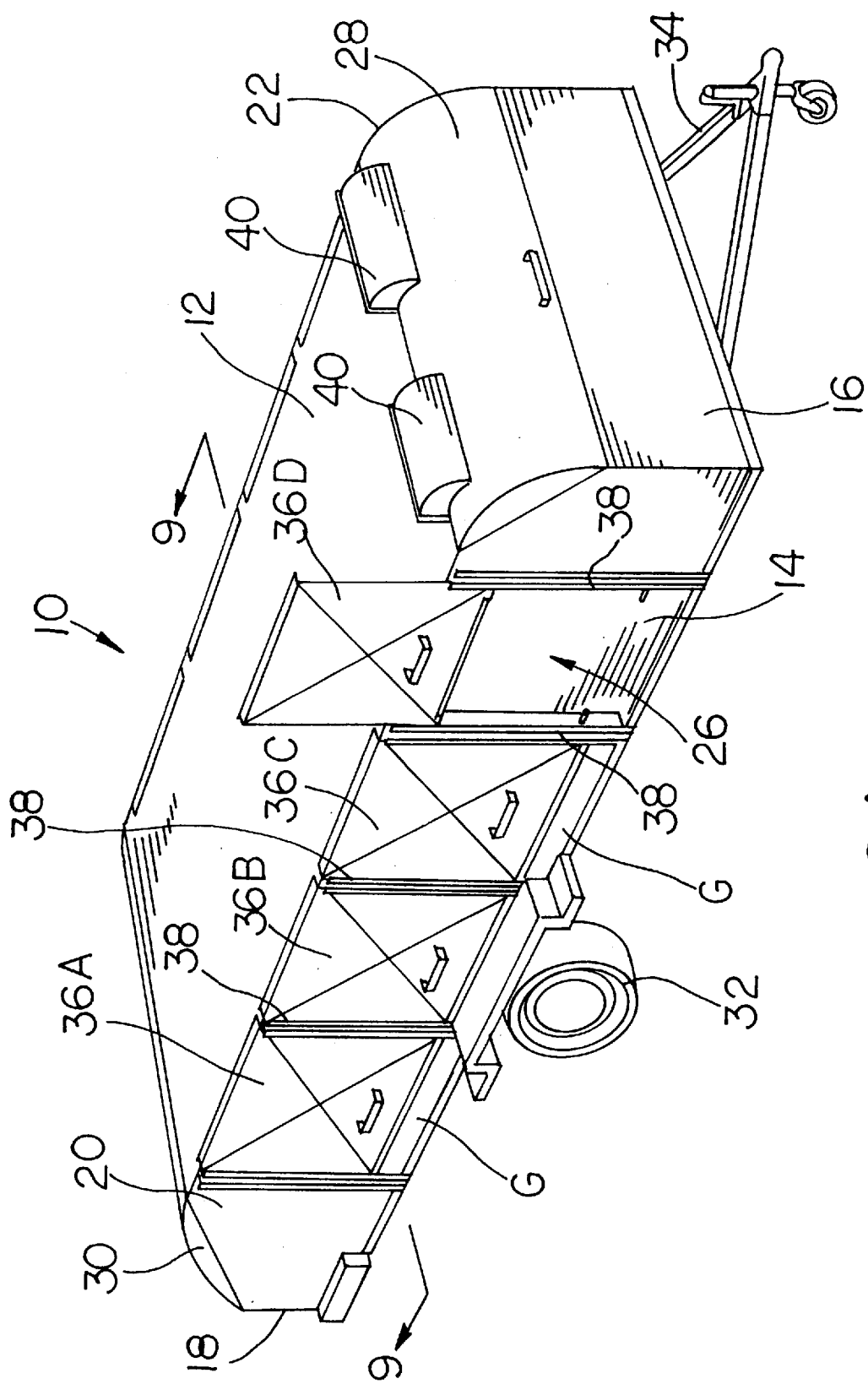
FIG. 1 is a view in perspective of a cooking machine made pursuant to the teaching of the present invention.

Referring now to the drawings, a cooking machine generally indicated by the numeral 10 includes a top wall 12, a bottom wall 14, front and rear walls 16, 18, and side walls 20 and 22. Together the walls 12-22 define a cooking chamber generally indicated by the numeral 26, in which food products (not shown) are conveyed in a conveyor (not shown) within the cooking chamber 26. A heat source, such as gas or charcoal (not shown), is supported within the cooking chamber 26. Doors 28, 30 are provided in the front and rear walls 16, 18 to permit the operator to have access to the cooking chamber for loading uncooked food and unloading cooked food products. The cooking machine 10 is conveniently mounted on wheels 32 and is provided with a tow bar 34 so that the cooking machine can be moved from place to place.

Regardless of the type of fuel used, adequate air flow to the housing 10 must be provided in order to assure proper combustion. Furthermore, the cooking chamber 26 must be occasionally vented, either to reduce the temperature and/or to vent the cooking chamber 26 to relieve the latter from excess smoke, moisture, etc. and/or to lower the temperature thereof. Accordingly, the side 20 of the cooking machine 10 is provided with doors 36A–36D which are mounted for vertical movement relative to the cooking machine 10 and channel members 38 which are slidably engaged by opposite sides of the doors. Corresponding doors and channel members also provided on the side 22 of the cooking machine 10. The channel members 38 not only guide the doors for vertical movement, but also support and rigidify the top wall 12 of the cooking machine 10. In cooking machine that uses gas as a fuel, the doors on one side of the machine, for example the side 20, are shortened so that even when the doors are fully closed, a gap G is present between the bottom of some of the doors and the bottom wall 14 to provide combustion air through the unit which is vented through the vent 40. Each of the doors 36A–36D can be raised to a raised position to allow the aforementioned venting of the unit. Door 36D is shown in the raised position.

Figure 2:
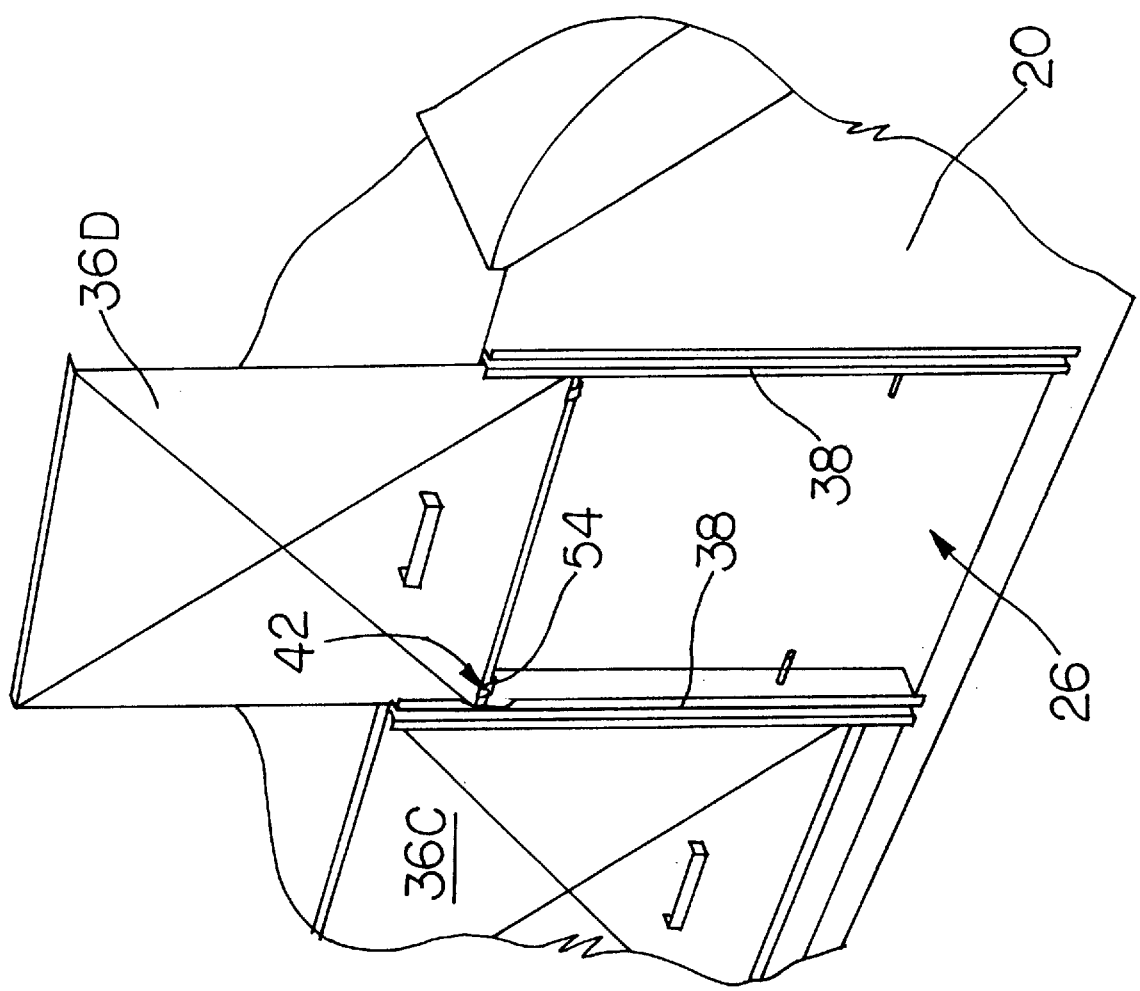
FIG. 2 is an enlarged fragmentary view of a portion of FIG. 1 illustrating the door being retained in the open position.
Figure 3:
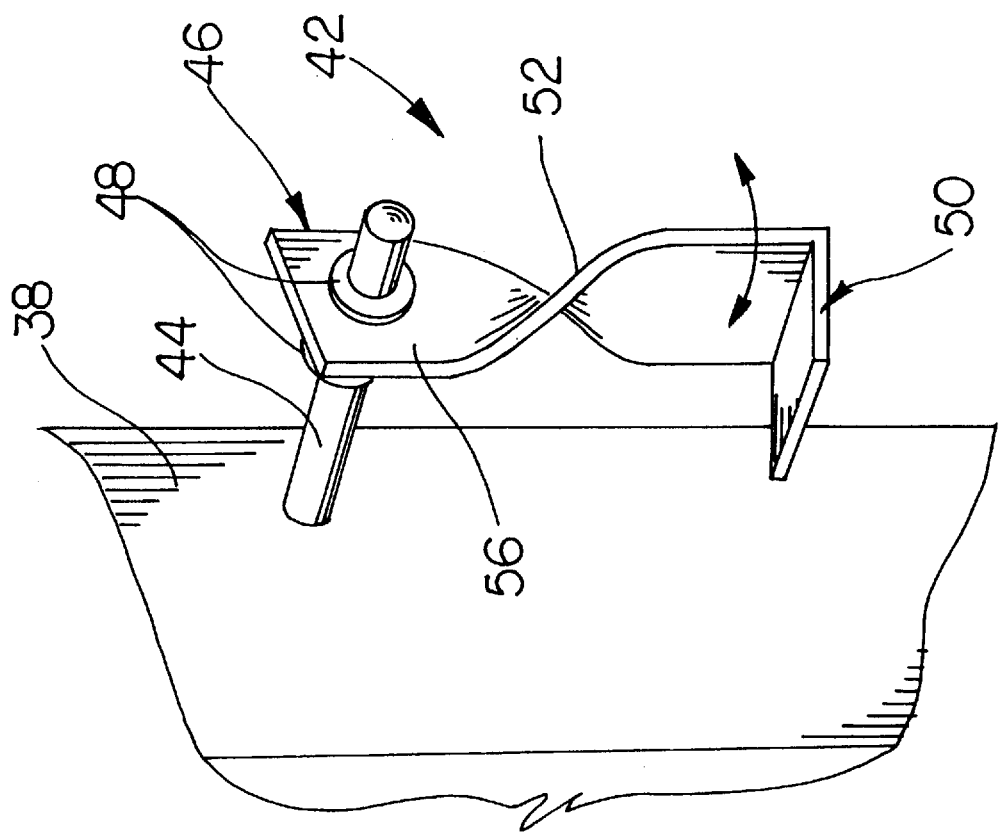
FIG. 3 is an enlarged, fragmentary, detailed view of the latching member used to retain the door in the open position as illustrated in FIGS. 1 and 2.
Figure 6:
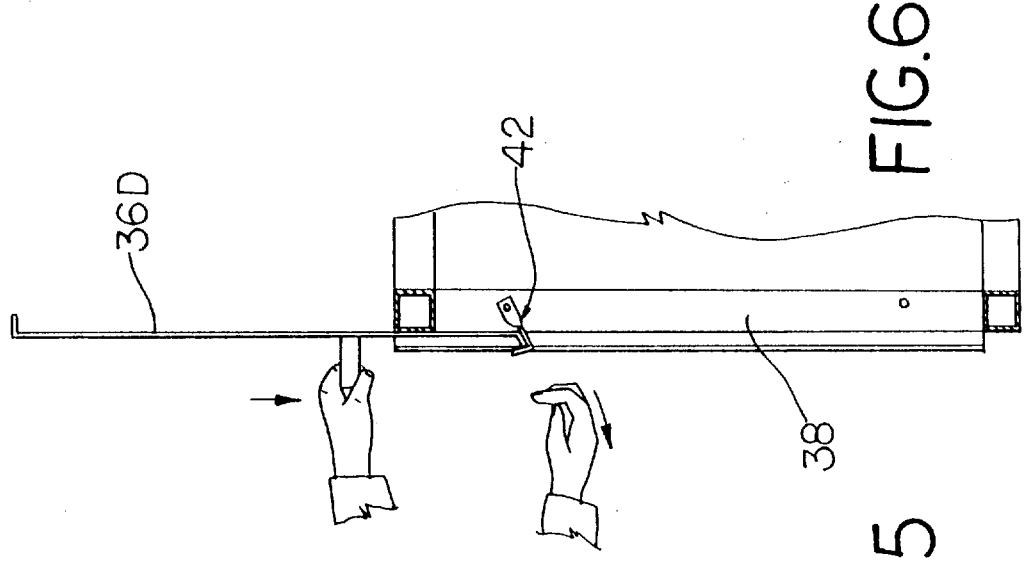

The doors 36A–D are held in the raised position illustrated in FIGS. 1 and 2 by a latching member generally indicated by the numeral 42. The latching member 42 includes a pivot pin 44 affixed to one of the channels 38 guiding the corresponding door 36A–D, a lever arm 46 rotatably mounted on the pivot pin 44 and held thereon by spring clip 48, and a laterally projecting finger 50. The lever arm 46 includes a twisted section 52 for joining the finger 50 transverse to the attachment portion 56 of the lever arm 46 through which the pivot pin 44 extends. The pivot pin 44 is located on the channel 38, and the weight of the latching member 42 is such that the length of the finger 50 such that the edge of the finger is displaced from the door by gravity when the latching member is allowed to hang freely from the pivot pin 44. However, the latching finger 50 is adapted to be moved into engagement with a latching surface 54 when the door is raised.

Figure 5:
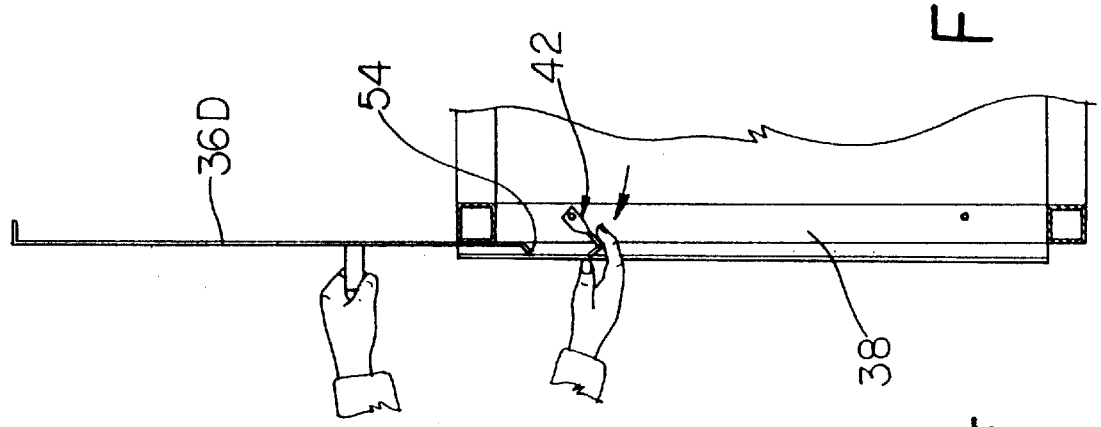
Figure 4:
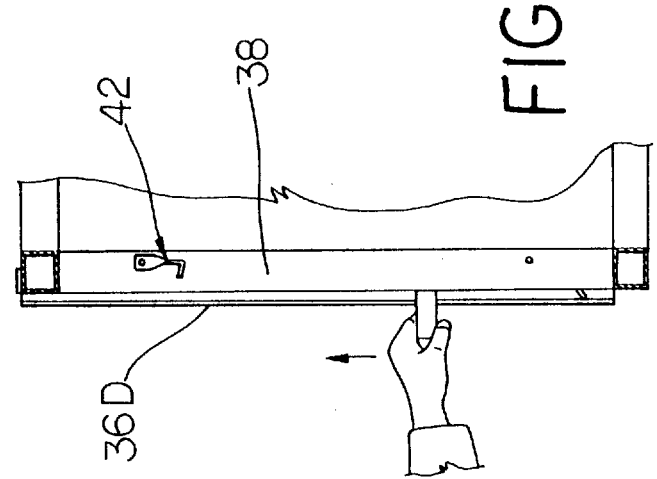

In operation, and referring now to FIGS. 4–8, when the cooking chamber 26 is to be vented, the operator grasps the handle on the door to be opened and as indicated in FIG. 4, and lifts the handle above the latching member 42 as indicated in FIG. 5, with the other hand, the operator pivots the latching member 42 into a position in which the finger 50 extends across the line of movement of the door. The operator can then move the door down and into engagement with the finger and release the door, which will be retained in the upper position by the engagement of the latching member 42 with the surface 54 of the door. When the door is to be released, and lowered, the operator grasps the handle and raises the door as indicated in FIG. 7, it permits the latching member to fall away from the support surface 54 and out of the line of travel of the door, thereby permitting the operator to move the door to the lowered position illustrated in FIG. 8.

What is claimed:

1. Cooking machine comprising a housing having side walls and end walls interconnecting top and bottom walls to define a cooking chamber therewithin, a heat source within said housing for generating cooking heat within the cooking chamber, and means for supporting food to be cooked within the cooking chamber, at least one of said side walls including channel members for slidably supporting a door for vertical movement relative to the housing to a venting position whereby the cooking chamber may be vented by raising the doors, and a latching member pivotally mounted on a corresponding channel member, said latching member including a laterally projecting finger for engaging a corresponding latching surface on the door when the door is raised to the venting position.

2. Cooking machine as claimed in claim 1, wherein said latching member includes a lever arm, and a pivot connecting with the lever arm, said finger projecting from said lever arm toward said door.

3. Cooking machine as claimed in claim 2, wherein said pivot is attached to said channel member at a distance from said door that is greater than the distance that the finger laterally projects whereby the weight of said latching member acting about said pivot moves said pivot away from the door when the door is moved away from the finger.

4. Cooking machine as claimed in claim 2, wherein said latching member is biased by gravity acting about said pivot to move the finger away from said door, whereby said door may be lowered past said finger when the door is closed.

5. Cooking machine as claimed in claim 2, wherein the door has a lower edge defining said latching surface.

6. Cooking machine as claimed in claim 2, wherein said lever arm includes an attachment portion engaged by said pivot and a twisted portion between the pivot and said finger.

7. Cooking machine comprising a housing having side walls and end walls interconnecting top and bottom walls to define a cooking chamber therewithin, a heat source within said housing for generating cooking heat within the cooking chamber, and means for supporting food to be cooked within the cooking chamber, at least one of said side walls including channel members for slidably supporting a door for vertical movement relative to the housing to a venting position whereby the cooking chamber may be vented by raising the doors, said doors having a lower edge, and a pivot pivotally mounting a latching member for movement relative to said door for engagement with the bottom edge to thereby hold said door in a raised position, said latching member being biased by gravity away from said lower edge of the door when the door is raised off of said latching member to permit the door to be lowered past said latching member to a closed position.

8. Cooking machine as claimed in claim 7, wherein said latching member includes a lever arm and a finger extending from said lever arm.

9. Cooking machine as claimed in claim 8, wherein said lever arm includes an attachment portion engaged by said pivot and a twisted portion orienting said finger transverse to said attachment portion.

\* \* \* \* \*